US006411762B1

(12) United States Patent
Anthon et al.

(10) Patent No.: US 6,411,762 B1
(45) Date of Patent: Jun. 25, 2002

(54) OPTICAL FIBER WITH IRREGULARITIES AT CLADDING BOUNDARY

(75) Inventors: Douglas Anthon, Wheaton, IL (US); Chris Emslie, Southampton; Peter Maton, Eastleigh, both of (GB)

(73) Assignee: Scientific-Atlanta, Inc., Lawrenceville, GA (US)

(*) Notice: Subject to any disclaimer, the term of this patent is extended or adjusted under 35 U.S.C. 154(b) by 0 days.

(21) Appl. No.: 09/448,101

(22) Filed: Nov. 23, 1999

Related U.S. Application Data (63) Continuation-in-part of application No. 08/987,862, filed on Dec. 9, 1997, now abandoned.

(51) Int. Cl.[7] .................................................. G02B 6/02
(52) U.S. Cl. ......................................... 385/123; 385/127
(58) Field of Search ................................. 385/123, 127, 385/146, 124, 126, 128, 141, 142, 144, 145; 372/6, 26

(56) References Cited

U.S. PATENT DOCUMENTS

| | | |
|---|---|---|
| 3,729,690 A | 4/1973 | Snitzer |
| 3,808,549 A | 4/1974 | Maurer |
| 4,815,079 A | 3/1989 | Snitzer et al. |
| 4,829,529 A | 5/1989 | Kafka |
| 5,121,460 A | 6/1992 | Turninelli et al. |
| 5,363,463 A | 11/1994 | Kleinerman |
| 5,373,576 A | 12/1994 | Minns et al. |
| 5,485,480 A | 1/1996 | Kleinerman |
| 5,533,163 A | 7/1996 | Muendel |
| 5,756,209 A | 5/1998 | Hale |
| 5,761,361 A | 6/1998 | Pfandl et al. ............... 385/100 |
| 5,790,735 A | 8/1998 | Oleskevich et al. |
| 5,808,518 A | 9/1998 | McKinzie, III et al. |
| 5,841,926 A * | 11/1998 | Takeuchi et al. ............ 385/123 |
| 5,892,615 A | 4/1999 | Grubb et al. |
| 5,949,941 A * | 9/1999 | DiGiovanni ................. 385/127 |
| 5,966,491 A * | 10/1999 | DiGiovanni ................. 385/127 |

FOREIGN PATENT DOCUMENTS

| | | |
|---|---|---|
| EP | 0 484 659 | 5/1992 |
| EP | 776074 A2 | 5/1997 |
| EP | 0 918 382 | 5/1999 |
| EP | 1 043 816 | 10/2000 |
| WO | WO 97/48648 | 12/1997 |

OTHER PUBLICATIONS

Wada Akira, "Rare Earth Added Polarization Maintaining Optical Fiber", Nov. 29, 1996, Japanese Patent Abstract #08313749.
Shirasaki Masataka, "Optical Fiber", Oct. 9, 1985, Japanese Patent Abstract #60200208.
Fujii Y. and Hussey, D., "Design Considerations for Circularly Form–Birefringent Optical Fibres," IEE Proceedings, vol. 133, Pt. J., No. 4, Aug. 1986, pp. 249–255.
Snitzer, E. et al., "Double–Clad Offset Core Nd Fiber Laser," Polaroid Corporation, OFC 1988, #PD5–4.
Po, E. Et al., "Double Clad High Brightness Nd Fiber Laser Pumped by GaAlAs Phased Array," Polaroid Corporation, OFC 1989, 190 PD7–1.

* cited by examiner

*Primary Examiner*—Cassandra Spyrou
*Assistant Examiner*—Euncha Cherry
(74) *Attorney, Agent, or Firm*—Hubert J. Barnhardt, III; Kenneth M. Massaroni; Shelley L. Couturier

(57) ABSTRACT

An optical fiber (10) made with a central core (12), a first cladding layer (16), and a second cladding layer (18) having a series of perturbations or irregularities formed into the otherwise generally circular outer boundary of the first cladding layer (16). The irregularities in the first cladding layer (16) interrupt the propagation of skew rays and encourage coupling into the core (12).

6 Claims, 3 Drawing Sheets

OPTICAL FIBER WITH IRREGULARITIES AT CLADDING BOUNDARY

RELATED APPLICATIONS

This patent application is a continuation-in-part of U.S. patent application Ser. No. 08/987,862, filed on Dec. 9, 1997 by Anthon et al. now abandoned and assigned to the assignee hereof.

FIELD OF THE INVENTION

The instant invention relates to double clad optical fiber optimized for use in, for example, fiber lasers and amplifiers, as well as methods of manufacture and uses therefor.

BACKGROUND OF THE TECHNOLOGY

Optical amplifiers, and in particular the optically-pumped erbium doped fiber amplifier (EDFA), are widely used in fiberoptic transmission systems (see, for example, E. Desurvire, *Erbium Doped Fiber Amplifiers*, Wiley, New York, 1994). In a typical device, a weak 1550 nanometer (nm) optical signal and a strong 980 nm pump signal, both propagating in single-mode optical fiber, are combined by means of a fused dichroic coupler into one single-mode fiber. This fiber is then coupled to a single-mode erbium-doped fiber where the erbium ions absorb the pump radiation and provide gain at the signal wavelength. The result is that the output of the EDFA is an amplified replica of the input signal. Such amplifiers are useful for overcoming the various losses that occur in any fiberoptic transmission system.

In a conventional fiber amplifier, the pump source consists of a laser diode operating in a single transverse mode coupled to single-mode optical fiber. The power density at the output facet of the pump laser limits the amount of optical power that can be obtained from such devices. To increase the diode output power, it is necessary to increase the emitting area of the diode. Unfortunately, when this is done, the transverse mode structure of the resulting broad area laser becomes multimode, and the laser output is no longer sufficiently coherent to be coupled into a single-mode fiber. Such a diode output can, however, be coupled into a multimode fiber to provide an essentially incoherent source for pumping the amplifier. Such multimode fibers are typically round, since this shape is easier to fabricate than any alternative shape.

In a variation of this design, ytterbium may be added to the fiber (as taught in, for example, U.S. Pat. No. 5,225,925, to Grubb et al. issued Jul. 6, 1993). In the optimized fiber disclosed in the '925 patent, energy absorbed by the ytterbium ions is efficiently transferred to the erbium ions. This results in a fiber with a much stronger, broader absorption than can be obtained in a singly-doped erbium fiber. An amplifier made from such fiber (a ytterbium-erbium doped fiber amplifier, or YEDFA), can be pumped with longer wavelength sources, such as a diode-pumped neodymium laser (see Grubb et al., Electronics Letters, 1991); output powers in excess of 4 watts (W) have been reported (Grubb et al. paper, TuG4 OFC 1996). The wavelengths of neodymium lasers used for this purpose has varied from 1064 nm in Nd:YAG to 1047 nm in Nd:YLF. Over this range in a typical fiber, the Yb absorption varies from 2 to 7 dB/m. For comparison, in the same fiber at 950 nm the absorption was 420 dB/m, and, at 975 nm, it was 2500 dB/m.

Techniques also exist for pumping an amplifier directly with multimode diodes. U.S. Pat. No. 3,808,549, issued Apr. 30, 1974, to Mauer discloses a design in which a small, strongly absorbing, single-mode core is embedded in a large, multimode waveguide. With all modes excited, the optical power density in such a double clad waveguide is nearly uniform across the waveguide aperture. Under these conditions, the average absorption coefficient is approximately equal to the absorption coefficient of the core, normalized by the area ratio of the two waveguides. Radiation propagating in modes that overlap the doped region will be preferentially absorbed, and some form of mode mixing is often required to maintain the uniform power distribution required to ensure that all the power in the multimode waveguide will eventually be absorbed by the core.

Using a double clad design of this type, Minelly et al. (IEEE Photonics Technology Letters, 5(3), 301–303, 1993) demonstrated a YEDFA pumped with a broad area laser diode. Minelly et al. used bulk optics to couple the output of a laser diode array to the double-clad fiber. Geometries using fused or reflective couplers similar to those used for conventional single-mode amplifiers can also be used. With some modification, for example, the filter wavelength division multiplexer (FWDM) made by E-Tek Dynamics, Inc. of San Jose, Calif. could be used as a multimode coupler. This, combined with a double clad gain fiber, would permit a multimode-pumped amplifier to be built in the same geometry as the conventional EDFA described above.

The fiber shown by Mauer was round with a concentric core, as was the fiber used by Minelly et al. This is a very inefficient shape for a double clad device. As noted by Snitzer et al. (U.S. Pat. No. 3,729,690, Apr. 24, 1973 and U.S. Pat. No. 4,815,079, Mar. 21, 1989), in a double clad fiber with radial symmetry, many of the modes in the multimode waveguide do not interact with, and are not absorbed by, a concentric core. This phenomenon can also be described by geometrical optics, where it would be observed that the vast majority of the guided rays are skew rays that never pass through the core. This problem is a result of radial symmetry and can be eliminated by perturbations that break this symmetry. Snitzer et al. proposed the use of an off-center, circular waveguide as well as a rectangular guide with two different transverse dimensions. Additionally, Lewis et al., in U.S. Pat. No. 5,418,880, and Muendel, in U.S. Pat. No. 5,533,163, teach the use of various space filling polygons. Such shapes are limited to triangles, certain symmetric quadrilaterals, and regular hexagons.

The techniques used to make fibers with these shapes generally resulted in polymer-clad fibers that were not round or which had a single-mode core that was not concentric with the fiber. Polymer-clad fibers are less stable thermally and mechanically than silica fibers, and they can be easily damaged by the pump radiation. Non-concentric fibers are difficult to align and splice. The fact that the fibers are not round makes it difficult to combine these fibers with more standard fiber components and to exploit the existing infrastructure of tools such as fiber cleavers, splicers, and ferrules that are optimized for use with round optical fibers. For practical applications, it is important to utilize a shape that can be surrounded by a thickness of low-index silica outer cladding with a round outer diameter. Typical 100/125 multimode fiber has a 12.5 micron (gm) cladding thickness. The maximum outer radius of the waveguide is constrained by the desired outer diameter minus the cladding thickness.

Multimode pump sources and couplers are also optimized for round fiber. To efficiently couple a round multimode pump fiber to a non-circular gain fiber, it is important that the pump fiber diameter be less than or equal to the minimum inner diameter of the low-index silica outer cladding.

Any radial perturbation in such fibers will be constrained to an annular region whose inner diameter is limited by the pump fiber diameter and whose outer diameter is limited by the fiber outer diameter and cladding thickness. The constraints on actual fibers are such that the radial dimension of the waveguide can only vary by ±10%, with values as small as ±5% being preferable in some cases. There is therefore a need for fibers that appear externally as round, concentric, all-silica fibers, but which nonetheless have been sufficiently perturbed to allow efficient double-clad absorption to occur.

Finally, it is important to recognize that double clad fibers are not truly single mode fibers. The same perturbations that allow efficient absorption also ensure that many guided modes at the signal wavelength will have appreciable overlap with the fiber core. This is often not a problem in a fiber laser, because the modes that oscillate will be those that most efficiently overlap the core region. However, in an amplifier, signal power that is coupled into the multimode waveguide could give rise to signal distortions when this signal is accidentally amplified and coupled back into the output signal. There is clearly a need for fibers that prevent these parasitic processes from occurring.

Accordingly, there exists a need for enhanced optical fibers in which guided rays propagating along the length of the fiber are passed through the fiber core. The enhanced fiber should retain the preferred round shape to remain compatible with other fiber components, as noted above. Likewise, the core of the fiber should preferably be substantially in the center of the fiber.

DETAILED DESCRIPTION OF THE INVENTION

While the specification concludes with claims defining the features of the invention that are regarded as novel, it is believed that the invention will be better understood from a consideration of the following description in conjunction with the drawing figures, in which like reference numerals are carried forward.

A conventional all-silica double-clad fiber consists of a doped core with a diameter less than 10 $\mu$m and a numerical aperture greater than 0.10, surrounded by a fused silica multimode waveguide with a diameter near 100 $\mu$m and a numerical aperture (NA) of 0.22, defined by an outer cladding of fluorine doped silica having a refractive index (n) equal to $n_{silica}$−0.017, where $n_{silica}$ represents the refractive index of undoped fused silica.

In the case of YbEr fibers, the optimum area for the multimode waveguide depends on the pump wavelength and the desired performance. For 1047 nm-like performance with a 950 nm pump, the area ratio would have to be 60. For 1064 nm-like performance with a 975 nm pump, an area ratio of 1250 would be acceptable. A typical value of 100 is consistent with typical pump diodes, single-mode core diameters, and multimode fiber numerical apertures. For example, the core diameter of a typical single-mode fiber at 1550 nm (Corning SMF-28) is 8.3 $\mu$m, leading to a multimode waveguide diameter of 83 mm. A typical 1 Watt (W) laser diode has an aperture of 100 mm and a numerical aperture of 0.13; assuming a (typical) silica multimode fiber numerical aperture of 0.22, this can be focused into a 60 $\mu$m fiber. The difference between 60 $\mu$m and 83 $\mu$m can be used to accommodate any mechanical tolerances and aberrations in the coupling optics.

The choice of core size is dependent upon which one of many attributes one wishes to emphasize in a particular application. In low power amplifiers, it is usually desirable to minimize the core diameter, D, in order to reduce the saturation power to the lowest possible value. This maximizes efficiency and allows the amplifier to operate with low input powers. In a high power amplifier, particularly one used for video applications, the input signal is usually much larger than the amplifier saturation power, and the issue of core size is less important. In fact, it is often desirable to maximize the core size to reduce the possibility of optical damage and to simplify splicing to conventional fibers. The optimum core size is then limited by the bending losses associated with large, low numerical aperture (NA) fibers. Since this is the same issue that determines optimum core sizes in standard telecommunications fiber, it appears that a similar fiber size (e.g., D=8.3 $\mu$m and NA 0.12 for SMF-28) would be optimal. In the case of double clad amplifiers, maximizing the doped core area maximizes the allowable size of the multimode waveguide, which in turn allows the use of larger, more powerful pump diodes and less demanding alignment tolerances.

To maximize the diameter of the doped core, it is necessary to maximize the diameter of the fundamental mode. In ordinary single mode fiber, this is done by making a larger core with a smaller numerical aperture. The usual way of doing this is to reduce the refractive index of the core. Unfortunately, in YbEr co-doped fibers, the refractive index of the core is fixed at $n_1=n_{silica}+0.013$ by the phosphorous and rare earth doping requirements. With a silica cladding, this gives a numerical aperture of approximately 0.20, resulting in a single mode waveguide diameter of 5.5 $\mu$m for cutoff at 1450 nm. In principle, increasing the refractive index of the cladding would reduce the numerical aperture. Decreasing the NA to a value of 0.12 would require a cladding index of $n_2=n_{silica}+0.008$. In a typical geometry, where the core is prepared by modified chemical vapor deposition (MCVD) and solution doping, this would suggest the use of a doped starting tube with a larger-than-normal refractive index. Unfortunately, such starting tubes are not readily available, so such an approach is not immediately practical.

Figure 1:
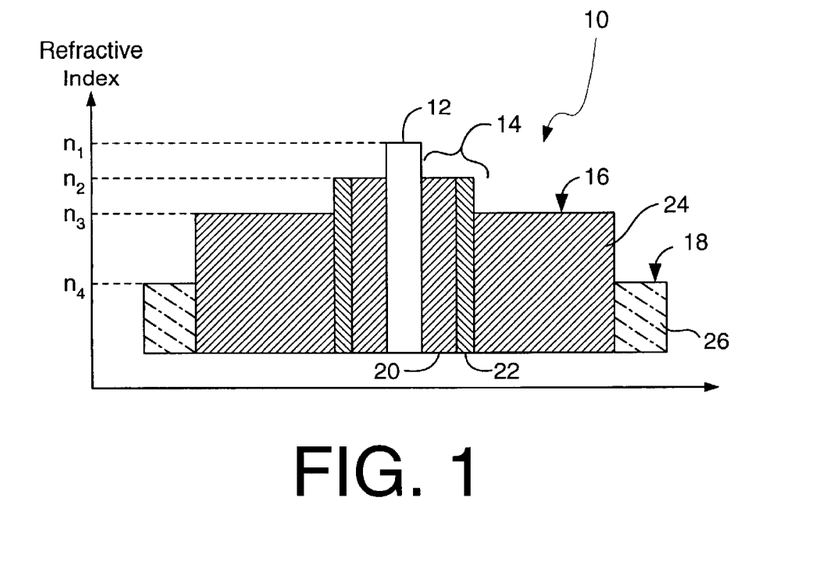
FIG. 1 is across sectional illustration of an optical fiber having a core and three claddings, in accordance with the present invention.

A more practical alternative for increasing the core area is to consider a multilayer core configuration. Referring now to FIG. 1, there is illustrated therein a cross-sectional view of an optical fiber 10 having a core 12, and three claddings 14, 16, and 18, respectively. Each of the core and respective claddings will be discussed in greater detail below. As illustrated in FIG. 1, a layer of doped material corresponding to cladding 14 may be deposited between cladding 16, such as a silica starting tube, and the YbEr doped core 12. If this layer of doped material is thick enough and is fabricated from the proper materials, then the properties of the fundamental radiation mode will be determined only by the core index and the surrounding index pedestal.

More particularly, the core 12 may be fabricated of any of a number of core materials known in the art, preferred materials being YbEr doped optical fibers that may further include a doping material such as phosphorous and/or cerium, among others. One preferred function of the first cladding 14, also referred to as the pedestal, is to have a higher index of refraction than the silica starting tube (cladding 16), though less than the core 12. The first cladding region 14 can include one or more layers of doped material, for example, a first doped layer 20 and a second doped layer 22, as shown. As such, layers 20 and 22 may be fabricated of any one or more materials, such as germanium-doped silica, that are well known in the art.

Layer 22 may have absorptive properties or may be adapted to perform other functions. Hence, in FIG. 1, layer 22 may be fabricated of a material that absorbs or strips undesirable modes of light. For example, layer 22 may be fabricated of a cobalt containing material. Other functions may be performed by, and other materials may be included in, both layers 20 and 22. It is also important to note that cladding 14 may be eliminated in certain applications.

Disposed about cladding 14 is second cladding 16, which can be fabricated of a layer of pure or modified silica material 24 or other material as is well known in the art. The third cladding layer 18 is disposed about the outside of the second cladding layer 16 and is typically fabricated of a fluorine doped silica material 26. The third cladding layer 18 is the outer covering for the optical fiber.

Typical refractive index profiles for the core and claddings are also shown below and in FIG. 1.

|  | CORE | Cladding 14 | Cladding 16 | Cladding 18 |
|---|---|---|---|---|
| Diameter in $\mu$m | 8.3 | 20 | 90 | 125 |
| Refractive Indices | 1.457 | 1.453 | 1.444 | 1.427 |

The optical modes typical of the structure of FIG. 1 can be calculated from the usual Bessel functions, and the effective indices and power densities can be calculated for each mode. The modes can be labeled by their effective indices as core modes ($n_1 > n_{eff} > n_2$), pedestal modes ($n_2 > n_{eff} > n_3$), and waveguide modes ($n_3 > n_{eff} > n_4$). The latter two groups are collectively referred to as cladding modes, and $n_{eff}$ refers to the effective refractive index of each.

Table 1 gives the effective refractive indices and the distribution of the modal power or modes (HE) in both the core and pedestal modes, as well as in the region defined by layer 20. The fraction of the power in this region can be used to estimate how losses in this region will affect the various modes.

TABLE 1

Properties of the core and pedestal modes at 1550 nm for the fiber shown in FIG. 1

|  | $n_{eff}$ | Core 0 < r < 4.15 | Pedestal 4.15 < r < 10 | Edge 8 < r < 10 |
|---|---|---|---|---|
| $HE_{11}$ | 1.45407 | 0.7783 | 0.2208 | 0.0053 |
| $HE_{21}$ | 1.45084 | 0.3428 | 0.6400 | 0.0960 |
| $HE_{12}$ | 1.44876 | 0.1642 | 0.7484 | 0.3014 |
| $HE_{31}$ | 1.44820 | 0.0807 | 0.8477 | 0.2520 |
| $HE_{22}$ | 1.44652 | 0.3049 | 0.5226 | 0.3269 |
| $HE_{41}$ | 1.44596 | 0.0158 | 0.8336 | 0.3710 |

The fundamental ($HE_{11}$) mode is well-approximated by a Gaussian with a $1/e^2$ radius $w_0 = 5.3$ mm, which is nearly identical to conventional single-mode fiber, such as SMF-28. However, the fiber is single-mode only in that there is only one guided core mode and that its $n_{eff}$ is sufficiently different from the other modes that any direct form of mode coupling is unlikely. It is not a true single-mode fiber because of the existence of guided cladding modes. The fact that some of these modes have appreciable overlap with the core 12 can complicate the performance of an amplifier using this fiber.

One potential difficulty created by the higher order guided modes is coupling loss. If there were appreciable mismatch between the fundamental modes of the two fibers, then there would likely be significant power coupled to higher order modes. In the fiber described here, however, the pedestal region has been designed to produce a fundamental mode that very closely resembles that of conventional single-mode fiber. Mode overlap arguments suggest that most of the incident power will be coupled to the fundamental mode. Nonetheless, fiber misalignments and imperfections will always result in some power being coupled into other guided modes. This power is likely to be concentrated in modes such as the $HE_{22}$ mode, which, as can be seen in Table 2, has appreciable overlap with the core region.

In an amplifier, these modes are likely to experience appreciable gain. The difficulty with this is that the amplified pedestal signal can be remixed with the fundamental mode signal by imperfections in the output splice. This has the potential for introducing multipath distortions into the optical signal, something that is usually intolerable in, for example, a video system. Other problems, such as gain depletion by cladding mode ASE, may also occur, but they are likely to be less significant than multipath signal distortion.

One way of avoiding this problem is to selectively attenuate the pedestal modes at the signal wavelength. As shown in Table 1, the fundamental mode intensity decreases rapidly outside the core region and is almost negligible in the edge regions of the pedestal. Most of the higher order modes have significantly higher power density in this region. If the edge region, i.e., layer 20, is doped, as described above, to be absorbing at 1550 nm, then the higher order modes will be attenuated without perturbing the fundamental mode. This absorbing region will perform a function similar to that of the mode stripping coatings on conventional single-mode fiber and will make the double clad fiber effectively single-mode at 1550 nm.

The choice of dopant is limited by the need for transparency at 950 nm. Dopants with the correct spectroscopic properties include $Tb^{3+}$, $Co^{2+}$, $OH^-$, and $B_2O_3$. To minimize the doping level and resulting index perturbation, a strongly absorbing dopant is desirable. Of the dopants listed, either $Co^{2+}$ or $Tb^{3+}$ appear to have the strongest contrast ratio (see Ainslie et al., *J. Lightwave Technology*, 6, 287–293, 1988), while $Co^{2+}$ is the most strongly absorbing. $Co^{2+}$ is the ion used in filter glasses such as Schott BG-3, which attenuate at 1550 nm with negligible loss at 950 nm. In fused silica, the absorption has a value of 0.4 dB/m/ppmw. (P. C. Schultz, *J. Am. Ceram. Soc.*, 57, 309, 1974). A $Co^{2+}$ concentration of approximately 100 ppmw in the edge region would give a loss of approximately 0.2 dB/m for the fundamental mode, 3.8 dB/m for the $HE_{21}$ mode, and much higher losses for the other modes. This would appear to be consistent with use in an amplifier with a few meters of fiber. $Co^{2+}$-induced loss at 950 nm is expected to be less than 0.01 dB/m.

$Co^{2+}$ can be introduced into the perform using conventional solution doping techniques. The existence of volatile compounds like $Co(CO)_3NO$ suggests that MCVD may ultimately be possible. A solution doped fiber would presumably be made by depositing a germanosilicate or aluminosilicate frit on the inside of the starting tube. After solution doping and sintering, this layer would have, for example, a $Co^{2+}$ concentration of approximately 100 ppmw and a refractive index equal to that of the germanosilicate layers that are then added to make the remainder of the pedestal region. Once these layers are in place, the YbEr core is deposited by conventional means. Note that this technique can be used in any double clad fiber and need not be limited to round or silica clad designs.

Potential problems include variations in the $Co^{2+}$ doping, index mismatches between the $Co^{2+}$ doped region and the rest of the pedestal, and the possibility of $Co^{2+}$ migration into regions where it will attenuate the fundamental mode.

The $Co^{2+}$ doped absorbing region of layer 20 can be used to eliminate problems at the signal wavelength, but there are also potential problems at the pump wavelength. The pedestal forms a waveguide with radial symmetry, and the higher order modes do not interact strongly with the core. Keeping the pedestal small minimizes this problem. All the modes in Table 1 have more than 1% of their power in the core region, so their absorption efficiency is no worse than for an average cladding mode. However, any further increase in the pedestal diameter would result in a group of modes with greatly reduced core interactions. This solution may not be possible for the waveguide modes, where a much larger waveguide area is required. Instead, it may be necessary to eliminate the radial symmetry of the waveguide.

Figure 2A:
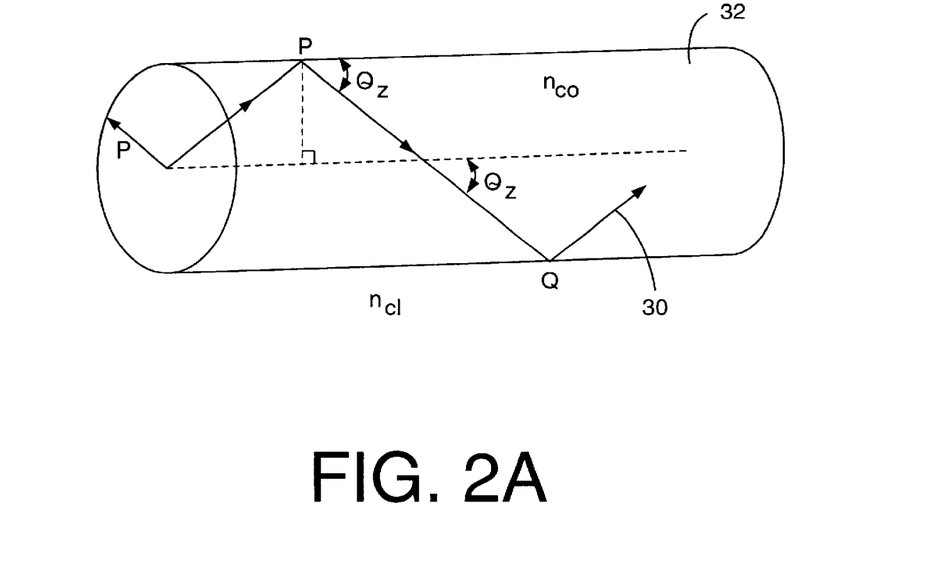
FIGS. 2A and 2B illustrate the propagation of light rays in a conventional round optical fiber.
Figures 2B, 3A, 3B, 3C:
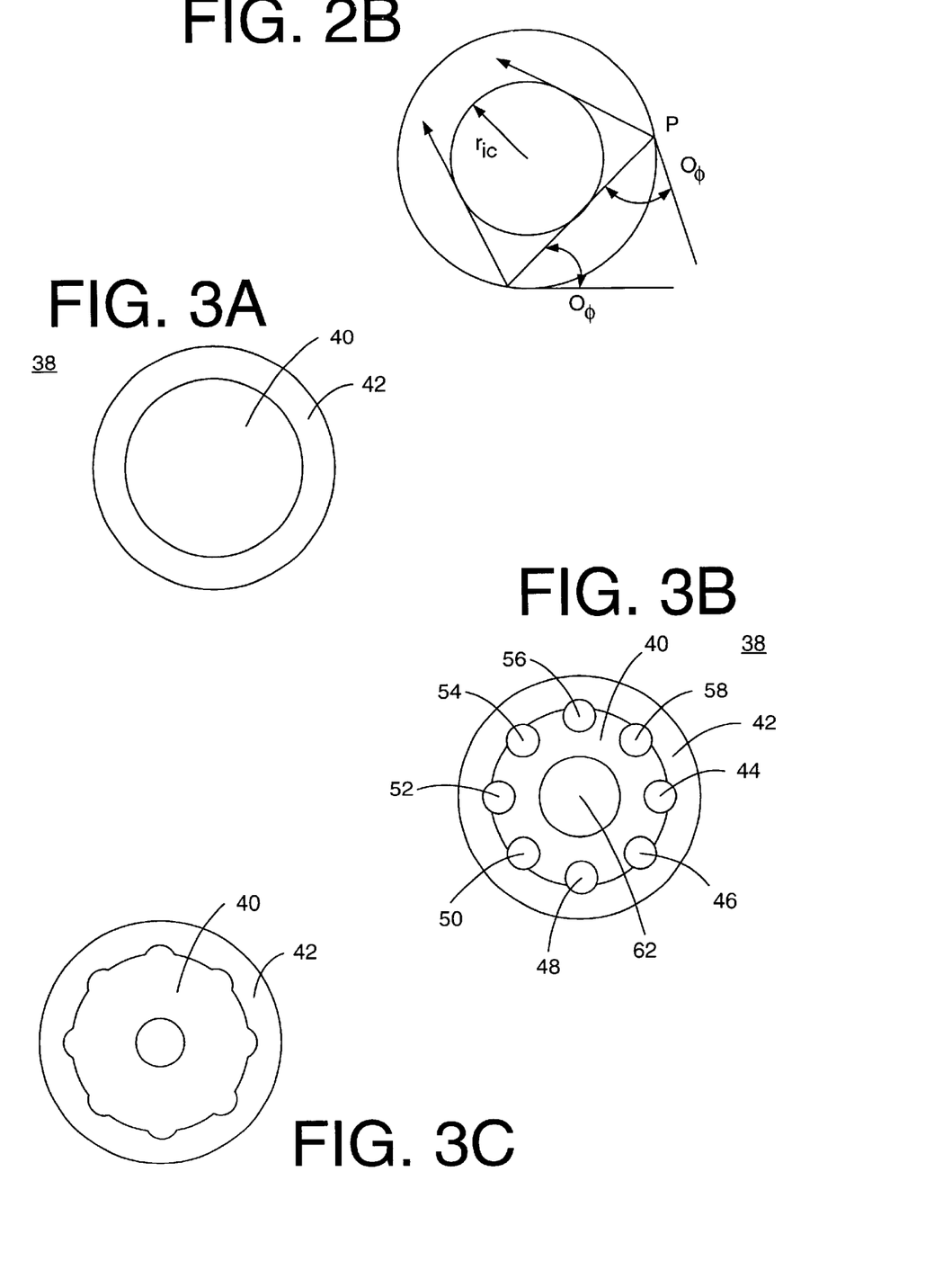
FIGS. 3A–3C are a series of cross sectional illustrations demonstrating steps for producing an noncircular waveguide embedded in a round glass fiber.

Referring now to FIG. 2, there is identified therein the propagation of light rays, e.g., 30, in a radially symmetric step-index fiber. FIGS. 2A and 2B illustrate propagation of the waveguide modes in a round outer cladding fiber 32, which is the starting point for analyzing the nonsymmetric geometries described below. The two angles $\theta_z$ and $\theta_\phi$ are defined in the drawing and are conserved on reflection. The propagation distance between reflections is given by $L_p=2r \sin \theta_{100} / \sin \theta_z$, and the distance of closest approach to the core is given by $r_{ic}=r \cos \theta_{100}$. For a given value of $\theta_z$, ray propagation can be characterized by a ray trace in the projection plane where it can be seen (in FIG. 2B) that $r_{ic}$ is invariant for a round fiber.

The modes of this fiber can also be described. Ignoring polarization effects, and assuming a low enough NA to allow the weak guidance approximation to be valid, the bound modes in the core are of the form $\Psi_{lm}(r,\phi)=J_l(r_{lm}) \exp(-il\Psi)$, where $J_l(r/r_{lm})$ is the Bessel function of the first kind of order l, where l can have positive or negative values, and where $\phi \equiv \theta_{100}$). Each value of l is associated with a set of boundary conditions that determine the radii $r_{lm}$, where m is used to distinguish the multiple solutions that can exist for a single l. All the modes with l>0 have zeros at r=0, and the overlap with an absorbing core bounded by some small value of r decreases rapidly with l. The total number of bound modes is finite, and it scales with the area and NA of the fiber.

Perturbed fiber shapes with modes that more strongly overlap the core can be found, even with the constraint of a round pump beam and a round outer fiber. Perturbations can be defined in the annular region defined by an inner radius $r_0$ equal to the radius of the pump fiber, and an outer radius of $r_0+\delta r_{max}$, equal to the outer fiber radius minus the cladding thickness. In fibers that can be manufactured in practical manufacturing processes, a range of $0.05 < \delta r_{max}/r_0 < 0.20$ is typical.

Modes can be calculated for a few specific waveguides. For example, consider $\delta r(\phi)=r_0[1-\sec((\frac{1}{2})\sin^{-1}(\sin(2\phi)))]$, corresponding to a square waveguide, with $\delta r_{max}/r_0=0.41$. The modes are of the form $f(x)g(y)$, where f and g are sines or cosines. Because of the cosine terms, 25% of the modes have maxima at the fiber center. This is not ideal because the remaining 75% of the modes have minima at the center and will not be absorbed without additional mode mixing. However, this shows how lower symmetry can enhance absorption.

If $\delta r_{max}$ is small, perturbation theory can be used to express the modes as linear combinations of the modes of the radially symmetric fiber. Absorption will be enhanced when modes with smaller values of l modify unperturbed modes with a large value of l. The mixing of modes differing by $\Delta l$ is determined by overlap integrals of the form $$\int_0^{2\pi} \delta r(\phi) \exp(-i\phi \Delta l) d\phi,$$

which, with $\delta r(\phi)$ described by a real Fourier series, $$\delta r(\phi) = \sum_{j=-\infty}^{\infty} c_j \exp(ij\phi), \text{ with } c_j^* = c_{-j},$$

become proportional to $c_{\Delta l}$. Thus, the absorption in these fibers is determined by the spatial frequencies of the radial perturbations in the fiber, that is, by the roughness of the interface.

This perturbation approach is impractical for all but very small values of $\delta r(\phi)$ because it requires detailed enumeration of all the modes of the fiber. Larger perturbations can be best analyzed using geometric optics. In terms of ray optics, the perturbations that couple modes with different values of l are equivalent to perturbations that cause rays to change values of $r_{ic}$. For absorbing fibers, the important parameter is the propagation interval in which all rays that start with large values of $r_{ic}$ pass at least once through small values of $r_{ic}$. Since $\theta_z$ is conserved in a straight fiber, the path length in the projection plane is proportional to the propagation length. Thus, the propagation of rays can be characterized by a two dimensional ray trace in the projection plane, with the appropriate figure of merit being related to the path length in this plane normalized to $r_0$. Practical evaluation of fiber shapes can be achieved by considering an ensemble of rays launched with large $r_{ic}$ (for example, $r_{ic}>0.9 r_0$) and then propagating these rays in the plane until a large fraction (for example, 90%) of the rays has passed at least once along a trajectory with a small value of $r_{ic}$ (for example, $r_{ic}<0.1 r_0$). The figure of merit $L_{90}/r_0$ for the perturbation is then equivalent to the normalized path length in the projection plane required to achieve this.

The first shapes to consider are regular polygons. A simple analytical model can be derived by noting that, for a regular polygon with N sides, each reflection changes the skew angle of a ray from $\phi$ to something in the range $\phi \pm \pi/N$. After M uncorrelated reflections, this evolves into a Gaussian distribution centered at $\phi$ with standard deviation of a $\sigma=(\pi/N)(M/3)^{1/2}$. When $\sigma > \pi/2$, or when $M >> 3N^2/4$, this corresponds to uniform illumination that is independent of the original value of $\phi$. Consequently, one might expect that $L_{90}/r_0$ will increase as the square of the number of sides.

Table 2 gives values of $L_{90}/r_0$ as a function of the number of sides calculated on the basis of 200 rays launched with $r=0.95\pm0.05$. As Monte Carlo simulations, these results contain appreciable uncertainties, but they give an idea of the relative performance of the different shapes. One observation is that the performance of the triangular and pentagonal shapes is nearly identical. A second observation is that while $L_{90}/r_0$ increases with the number of sides, it does not approximate a smooth quadratic function. Although the even and odd values larger than 4 scale approximately quadratically, the even-sided polygons appear to be twice as efficient as their odd-sided counterparts. Furthermore, the calculated values for the three- and four-sided figures are significantly larger than the values extrapolated from larger polygons.

TABLE 2

Figures of merit for mode mixing in regular polygonal fibers.

| Number of sides | 3 | 4 | 5 | 6 | 7 | 8 | 9 | 10 |
|---|---|---|---|---|---|---|---|---|
| $L_{90}/r_0$ | 54 | 46 | 56 | 42 | 119 | 73 | 184 | 132 |
| $\delta r_{max}/r_0$ | 1.00 | 0.414 | 0.236 | 0.155 | 0.110 | 0.082 | 0.064 | 0.051 |

Polygons are not especially well adapted to the problem of making all-silica nearly-round fibers with small values of $\delta r_{max}$. The first polygon to have $\delta r_{max}/r_0 < 0.1$, for example, is an octagon. This is a potentially useful shape since it gives a figure of merit only slightly worse than that of the triangular fiber. Furthermore, the fiber has a centered core and has equal radii across any two perpendicular directions. These features make this shape distinctively different from those considered by Snitzer et al. and Po et al.

The problem with this shape is fabrication. Polymer clad rectangular fibers have been made by grinding the preform to the desired shape and then drawing the fiber near enough its softening point that the shape is preserved. The polymeric cladding is then coated onto the fiber where it conforms to the existing shape. The equivalent fabrication process for an octagon is greatly complicated by the larger number of sides to be ground. It is also difficult to make all-silica polygonal fibers, since there is no readily apparent process analogous to the low-index organic coating that produces a conforming low index silica cladding.

One technique that is conventionally used to introduce asymmetry into fibers is gas-phase etching. This is the process used to produce "bow-tie" birefringent fiber. By etching a series of channels into the inside diameter of a low index tube and then collapsing the tube over a silica preform, a surface approximating a sinusoidal surface with $\delta r(\phi) = \delta r_{max}/2)(1-\cos[n\phi])$, might be fabricated. (In this equation, n is a variable and does not represent the refractive index.) For odd values of n, this fiber is "circular" in the sense that $r(\phi)+r(\phi+\pi)=2r_0+\delta r_{max}$ for all values of $\phi$. Values of $L_{90}/r_0$ for this geometry with $\delta r_{max}/r_0=0.1$ are given in Table 3. For n=1, the shape closely approximates an off-center circular fiber and, for n=2, the shape closely approximates an elliptical fiber with an eccentricity of 1.1. These shapes closely approximate the shapes recommended by Snitzer et al., and, in this case, neither one appears to work very well. On the other hand, the performance for n>5 can be as good or better than that obtained from the polygonal shapes.

TABLE 3

Figures of merit for mode mixing in sinusoidal fibers.

| n | 1 | 2 | 3 | 4 | 5 | 6 | 7 | 8 | 9 | 10 |
|---|---|---|---|---|---|---|---|---|---|---|
| $L_{90}/r_0$ for $\delta r_{max} = 0.1 r_0$ | >999 | >999 | >999 | 163 | 60 | 37 | 48 | 39 | 40 | 46 |

Unfortunately, the gas-phase etching technique is best suited to a two or three lobe figure, and it would be quite difficult to fabricate the more-efficient shapes with larger values of n. Alternative shapes that are more readily fabricated would be desirable.

Referring now to FIGS. 3A–3C, there is illustrated a process by which asymmetries can be introduced into optical fibers, such as that identified in FIG. 1, with rod-in-tube fabrication techniques. This technique is used, for example, to produce birefringent fibers. FIG. 3A shows a conventional preform 38 for an all silica multimode fiber. In this preform 38, an inner silica region 40 is overlaid with a layer of fluorine doped silica 42. Such preforms are available commercially from Hereus.

In FIG. 3B, eight holes 44–58, each with a radius of, for example, $r_b=0.2r_0$ and $\delta r_{max}/r_0=0.1$, have been made in this preform 38 using, for example, an ultrasonic mill. The holes 44–58 may be circular holes as illustrated in FIG. 3B, or they can approximate other shapes. The holes are simply present to introduce irregularities into the shape of preform 38 at the boundary between the two regions 40, 42 of material. Undoped silica rods may then be inserted into these holes to produce the profile shown in FIG. 3C.

A circular hole 62 can also be drilled longitudinally through the center of the preform 38 for insertion of core material, which can be in the form of another preform. By way of example, another preform comprising a fiber core surrounded by a cladding layer, corresponding, respectively, to the core 12 and pedestal region 14 of FIG. 1, may be introduced into the center hole of preform 38. In this case, region 40 of the preform 38 would correspond to second cladding 16 (FIG. 1), and region 42 of the preform 38 would correspond to third cladding 18 FIG. 1). It will be appreciated, however, that an unclad core preform could be inserted into preform 38 such that region 40 forms a first cladding layer.

The result is an optical fiber having a central core region appropriately doped to absorb radiation and provide gain at preselected wavelengths. Disposed around the core may be a first region adopted to modify or strip modes in light introduced into the core. Around the first region is disposed a cladding layer 40 formed of silica, for example, and having a radially constrained, quasi-circular outer boundary.

The term "radially constrained, quasi-circular" is used to indicate that the outside surface of the cladding layer 40 is generally round in cross-section and tubular overall, but, due to the pattern of predefined irregularities manufactured into the cladding, the outer boundary does not define a smooth, regular circle or tube. Instead, the outer boundary, while remaining quasi-circular, includes multiple, regularly spaced lobes for perturbing the outer boundary. Thereafter, disposed around the cladding layer 40 is an outer cladding layer 42 having a typical round outer boundary and also having an inner boundary which conforms to the outer boundary of the cladding layer 40.

This radially constrained, quasi-circular boundary between cladding layer permits easy alignment and processing with conventional fabrication/alignment equipment. On the other hand, prior art fibers including elliptical, rather than quasi-circular, boundaries between core and cladding layers or between two cladding layers can be extremely difficult to process using conventional equipment, rendering such prior art fibers impractical for use, especially in volume applications.

The effectiveness of the design illustrated in FIG. 3 is determined by both the size and number of holes. Accordingly, the instant invention is not limited by the number of holes, the hole sizes, nor the symmetry of their arrangement. Rather, any number of variably sized holes may be appropriate for a given fiber application. For example, highly symmetric fibers with many small holes may be optimum in cases where stress-induced polarization needs to be minimized, while less-symmetric fibers with fewer, larger holes may be optimum in cases where cost of fabrication is paramount. Table 4 gives calculated figures of merit for different hole arrangements.

For a given hole size, the figure of merit decreases almost linearly with the number of holes. This is to be expected since any reflection from the original round surface causes no change in $r_{ic}$. Since each new hole or irregularity reduces the amount of unperturbed surface, it also reduces the time that each ray spends "idling" at a particular value of $r_{ic}$. Larger holes also contribute to this effect because each hole occupies a larger fraction of the fiber circumference. However, for a given circumference, a larger number of smaller holes is more effective, as can be seen by comparing the bracketed values in Table 4.

rods. Values in brackets, [ ], represent shapes with approximately equal unperturbed circumferences. As shown, smaller values correspond to better performance.

It can be inferred from the data in Table 4 that the performance of the fibers improves with the number of holes, and that if enough small holes are used, the performance will match or exceed that of the best of the polygonal fibers. Unfortunately, there are limits to the size and number of holes that can be made. Many of the best values in Table 4 are in parentheses, indicating that they are fabricated by commercially impractical methods and that they cannot be fabricated by rod-in-tube methods due to interference between adjacent rods. Other potentially efficient combinations are not even shown because they require an impractically large number of holes. More elaborate (and costly) fabrication techniques can be imagined in which one set of rods is inserted and the preform fused before a second set of holes are made, but such techniques may well be impractical.

There are, however, several feasible combinations of hole sizes and diameters that can be used to achieve performance similar to that observed previously with the octagon. In particular, a set of eight (8) holes with $r_b/r_0=0.2$ closely mimics the performance of an octagon, including the properties of a centered core in a fiber that does not have differing orthogonal radii. The combinations involving fewer, but larger, holes may be easier to fabricate, simply because there are fewer holes to make. In particular, the combination of four (4) holes with $r_b/r_0=0.4$ may be a more practical, if somewhat less efficient, alternative. If space is available, the

TABLE 4

Figures of merit for different hole diameters in the geometry shown in FIG. 3 with $\delta r_{max}/r_0 = 0.1$

| Number of holes $\delta r_{max = 0.1 r 0}$ | 1 | 2 | 3 | 4 | 5 | 6 | 7 | 8 | 9 | 10 |
|---|---|---|---|---|---|---|---|---|---|---|
| $L_{90}/r_0$ for $r_b/r_0 = 0.1$ | 610 | 303 | 242 | 143 | 107 | 133 | 129 | 131 | 110 | [72] |
| $L_{90}/r_0$ for $r_b/r_0 = 0.2$ | 685 | 255 | 221 | 163 | [136] | 109 | 86 | 75 | 73 | 76 |
| $L_{90}/r_0$ for $r_b/r_0 = 0.3$ | 494 | 238 | [155] | 112 | 93 | 75 | 73 | 60 | (58) | (52) |
| $L_{90}/r_0$ for $r_b/r_0 = 0.4$ | 324 | 169 | 126 | 107 | 88 | (53) | (46) | (50) | (45) | |
| $L_{90}/r_0$ for $r_b/r_0 = 0.5$ | 317 | 169 | 110 | (80) | (69) | (58) | (56) | (51) | | |

The values in parentheses, ( ), cannot be fabricated by rod-in-tube methods due to interference between adjacent rods.

value of $\delta r_{max}/r_0$ to 0.2 can be increased to improve the efficiency somewhat, as shown in Table 5.

TABLE 5

Figures of merit for the geometry shown in FIG. 3 with $r_b/r_0 = 0.4$ and $\delta r_{max}/r_0 = 0.2$

| Number of holes $\delta r_{max} = 0.2 r_0$ | 1 | 2 | 3 | 4 | 5 | 6 | 7 | 8 | 9 | 10 |
|---|---|---|---|---|---|---|---|---|---|---|
| $L_{90}/r_0$ for $r_b/r_0 = 0.4$ | 303 | 160 | 108 | 71 | 71 | (61)* | (55)* | | | |

*(The values in parentheses, (), cannot be fabricated by rod-in-tube methods due to interference between adjacent rods.)

FIGS. 4A–4D illustrate a similar fabrication technique that can be used to introduce irregularities into the shape of a preform 65. According to this technique, a standard multimode preform 65, comprising, e.g., an undoped fused silica inner region 68 and a fluorine doped outer layer 70, is obtained. An ultrasonic drill is used to drill equally spaced holes 72–84 immediately inside the boundary between inner region 68 and layer 70. By way of example, eight holes, each having a diameter of about 10% of the preform diameter, can be drilled on circle at about 60% of the preform diameter, leaving a small amount of silica material between the holes and the boundary between region 68 and layer 70 to protect the fluorosilicate glass of the outer layer 70. Preferably, the distance between each hole and the boundary between cladding layers 68, 70 is approximately 1–2% of the preform diameter.

Next, a hole (FIG. 4B) of approximately 40% of the preform diameter is drilled in the center of the preform 65 for insertion of a single mode preform 80 that will subsequently form the core of the fiber. The single mode preform 80 has been prepared in a conventional fused silica tube using a conventional modified chemical vapor deposition (MCVD) technique. In some cases, it may be desirable to etch the preform 80 with hydrofluoric acid for control of the final diameter.

Figure 4A:
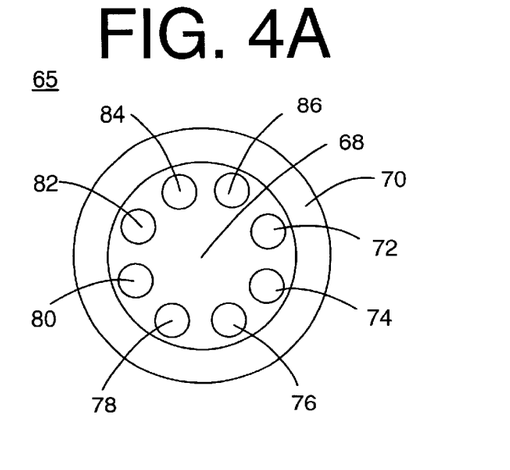
FIGS. 4A–4D are a series of cross sectional illustrations demonstrating steps for an alternative method of producing a noncircular waveguide embedded in a round glass fiber.
Figure 4B:
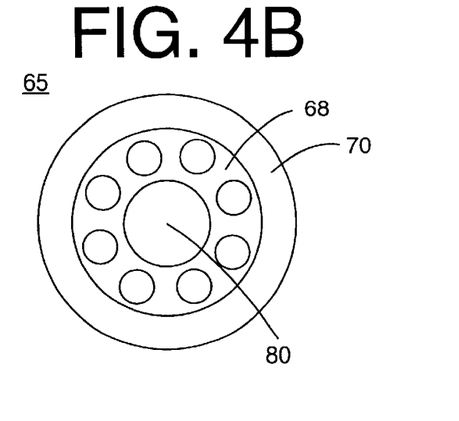
Figure 4C:
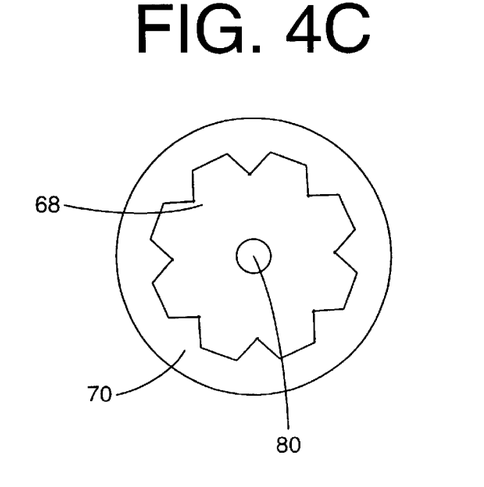
Figure 4D:
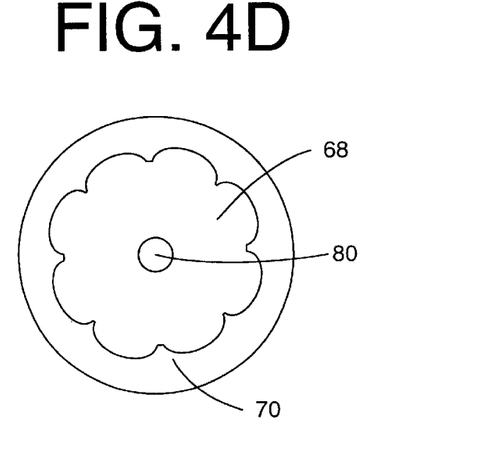

The preform 65 is then drawn to result in shapes similar to those shown in FIGS. 4C and 4D. The shape of the indentations that form in the boundary between cladding layer 68 and cladding layer 70 depends upon the thickness of the silica layer between each hole and cladding layer 70 before the preform 65 is drawn. FIG. 4C is representative of the shape provided when the thickness of the silica layer between each hole and cladding layer 70, before the preform 65 is drawn, is about 1% of the preform diameter. FIG. 4D is representative of the shape provided when the thickness of the silica layer between each hole and cladding layer 70, before the preform 65 is drawn, is about 2% of the preform diameter.

As the fiber is radially heated during the drawing process, the thinner (e.g., 1% thickness) silica bridge layer apparently buckles at its center to produce the narrow, deep indentations of FIG. 4C. When the thicker (e.g., 2%) silica layer is left between each hole and the cladding boundary, the silica bridge layer collapses in a more uniform manner to generate the broader, shallower indentations of FIG. 4D.

Calculations analogous to those set forth above with respect to FIG. 3 indicate that the shape of FIG. 4C has an efficiency comparable to a regular octagon, while the shape of FIG. 4D is somewhat more efficient, exhibiting an efficiency comparable to a regular hexagon. The sharper peaks of FIG. 4C cause stronger deflections, but it is believed that the greater number of rays deflected by the broader peaks of FIG. 4D result in the difference in efficiencies of the two shapes.

An advantage of the technique illustrated by FIG. 4 is that the drawing process does not produce interfacial bubbling of the fluorosilicate glass of cladding layer 70, which might occur in some situations. Instead, shifting of the holes to the region just inside the boundary between cladding layers 68, 70 provides the thin layer of undoped fused silica that protects the fluorosilicate glass to prevent outgassing and the resulting bubbling that could occur.

Another approach to the problem is to leave the core diameter intact but to introduce perturbations into the fiber index. This could be done, for example, by inserting rods with higher refractive indices in place of the silica rods in FIG. 3. These rods would act as cylindrical lenses to refocus the skew rays to new values of $r_{ic}$, as do the cylindrical mirrors of the previously described technique. An advantage of this technique is that the rods do not need to extend outside of the round cladding boundary, but instead will be effective if they are merely tangent to the interface. There are some limitations to this technique, however. For example, the rod of radius $r_b$ that has a focal length $r_b/2$ as a reflector, has a focal length of $(r_b/2)(n/\Delta n)$ as a refractive rod with a refractive index of $n+\Delta n$, where n is the refractive index of the original material. Since in most practical cases, $\Delta n<<n$, the reflector will be much more strongly focusing than the lens, and effectiveness of the refractive technique will be much lower than that of the reflective technique. Nonetheless, it may provide a practical alternative in some cases, especially if large values of $\Delta n$ are achievable.

A second related technique is to introduce stresses into the first cladding region so that the stress-induced index changes perturb the skew ray trajectories. Stresses could be introduced by adding stress members such as borosilicate rods that are inserted into the region outside the waveguide. This has the advantage of providing perturbations that are all external to the guiding region so that no extra losses are introduced. Stress introduces both index changes and birefringence, and both can perturb the ray trajectories. The index changes will produce lensing analogous to that produced by the rod lenses, although shapes of the index distortions are unlikely to be conveniently round and lens-like, so the exact deflections will be difficult to calculate. Birefringence can cause the reflections to occur at angles different from the usual law of reflection. This is analogous to double refraction. The magnitude of the index changes that can be achieved by stress is quite small, as distortions large enough to change the material density appreciably also tend to cause fracture in a brittle material like glass. Thus, it is unlikely that the perturbations achieved by this technique will be as effective as those created by the reflective technique. Nonetheless, it may be a useful technique in some cases, especially when loss is an important issue.

EXAMPLES

A Cladding Pumped YEDFA

In principle, a 1 watt laser diode at 950 nm (model 6360 from SDL, Inc., San Jose, Calif.) can be coupled to 60/125, 0.22 NA, all-silica multimode fiber with an efficiency approaching 100%; an actual coupling efficiency of at least 80% is reported using a lens system sold by LIMO-Lissotschenko Mikrooptik, GmbH, Dortmund, Germany. This produces an 800 mW output that can then be relayed through a pair of graded refractive index lenses (Selfoc GRIN 1 5 lenses made by Nippon Sheet Glass Ltd., Tokyo, Japan) into an 80/125, 0.22 NA, all-silica multimode fiber. The increase in fiber diameter is required to accommodate spherical aberration in the GRIN lenses. Note that this is equivalent to the imaging system found in the filter wavelength division multiplexer (FWDM) made by E-Tek Dynamics, Inc. of San Jose, Calif., where a single GRIN lens and a reflector are used to couple a pump fiber to an adjacent output fiber. Although this imaging system was intended for single-mode fiber, it should, allowing for some aberrations, work equally well for multimode fibers.

The other input to the FWDM is a single-mode fiber (SMF-28), having an output that is collimated with a second GRIN lens, transmitted through the (dichroic) reflector and refocused into the (ordinarily SMF-28) output fiber. If the output fiber of the FWDM is replaced with a double-clad gain fiber with an NA of 0.22, $r_0=40$ mm, a fundamental mode matched to SMF-28, and an outside diameter of 125 mm, then both inputs to the FWDM will be coupled to the output fiber, which will serve as an amplifier.

A multimode preform can be obtained from Hereus-Amersil, Inc, (Duluth, Ga.). The multimode preform, which comprises a fused silica rod with a diameter of 20 mm, is surrounded by a 5.6 mm thick layer of a fluorosilicate material with a refractive index that is 0.017 lower than that of undoped fused silica. Using an ultrasonic mill, 5 holes are drilled parallel with the axis of the rod. One is centered on the axis, and the other four are symmetrically arranged with their centers 9 mm from the axis. The rods to be inserted in the 4 radial holes are made from fused silica. The rod to be inserted in the central hole is a preform made by MCVD and solution doping techniques.

On the inside wall of a silica tube with a cross-sectional area of 8.64 $mm^2$, a germanosilicate frit with a cross-sectional area of 7.07 $mm^2$ is prepared and solution doped with $Co^{2+}$ from an aqueous solution. This layer will have a $Co^{2+}$ concentration of 100 ppmw and a refractive index that is 0.008 greater than that of pure fused silica. This layer is dried and sintered as usual, and then a germanosilicate layer with a cross-sectional area of 9.42 $mm^2$ and with the same refractive index is applied over the first layer. Next, a phosphosilicate frit with a cross-sectional area of 3.14 $mm^2$ is applied, solution doped with Yb and Er, and then dried and sintered. The preform is collapsed to provide a 2 mm core of Yb and Er, and the core is surrounded by a 4 mm diameter Ge doped region, a 5 mm diameter Co doped region, and a 6 mm outer diameter layer of undoped fused silica.

This tube is then inserted in the central hole, and the entire preform is heated to fuse the rods into the holes. The preform is subsequently drawn to a 125 mm outer diameter using conventional techniques. A length of 2 to 10 meters will be sufficient to absorb a 950 nm pump and will provide gain in excess of 50 dB.

A second example would be a higher power laser pumped at the absorption maximum of 975 nm to yield performance similar to a 1064 nm-pumped device. In this case, an area ratio of 1250 combined with an 8.3 mm core would permit the use of a 290 mm outer waveguide. This is well-matched to the 10 watt fiber-coupled diode bars that are manufactured by Opto Power Corporation of Tucson, AZ and that emit from a 250 mm aperture with an NA of less than 0.22. These devices are available at 975 nm but must be temperature tuned to match the peak. The construction of the amplifier is similar to the previous device except that the outer waveguide of the fiber needs to be bigger. In addition, the larger fiber size may require some modification of the commercial FWDM.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An optical fiber, comprising:

a centrally disposed core region adapted to absorb radiation at a first wavelength and provide gain at a second wavelength, the radiation having at least one mode;

an intermediate cladding layer disposed around the core region, wherein the intermediate cladding layer comprises:

an inner transparent region adjacent to the core region; and an outer absorbing region adjacent to the first cladding region, the outer absorbing region absorbing radiation at a predetermined wavelength, wherein the outer absorbing region selectively attenuates modes propagating in the core region in favor of propagation of a fundamental mode of the optical fiber;

a first cladding layer having an outer boundary and disposed around the intermediate cladding layer, the first cladding layer having a plurality of irregularities formed at least along the outer boundary such that the outer boundary is radially constrained and quasi-circular; and a second cladding layer disposed around the first cladding layer, wherein the refractive index of the intermediate cladding layer is between that of the core region and the first cladding layer.

2. A method of fabricating an optical fiber, the method comprising the steps of:

obtaining a first preform comprising an inner layer, an outer layer, and a boundary between the inner and outer layers;

drilling a plurality of holes within the inner layer adjacent to the boundary;

forming a center hole at the center of the first preform within the inner layer;

inserting a second preform through the center hole of the first preform; and drawing the first and second preforms such that the boundary between the inner and outer layers collapses into each hole to form a plurality of irregularities along the boundary, wherein the boundary is formed into a radially constrained, quasi-circular shape.

3. The method of claim 2, wherein the inner layer is formed from undoped fused silica.

4. The method of claim 2, wherein the second preform forms a core of the optical fiber.

5. The method of claim 4, wherein the inner region forms a first cladding layer disposed about the core of the optical fiber.

6. The method of claim 5, wherein the outer region forms a second cladding layer disposed about the first cladding layer.

* * * * *

UNITED STATES PATENT AND TRADEMARK OFFICE
CERTIFICATE OF CORRECTION

PATENT NO. : 6,411,762 B1
DATED : June 25, 2002
INVENTOR(S) : Anthon et al.

It is certified that error appears in the above-identified patent and that said Letters Patent is hereby corrected as shown below:

Title page,
Item [75], Inventors: please correct the names of the inventors to read as follows:
-- Douglas Anthon, Wheaton, IL (US); Chris Emslie, Southampton; Peter Maton, Eastleigh; Ashley Speed, Southampton, all of (GB) --

Column 2,
Line 60, delete "(gm)" and insert therefore -- (μm) --

Column 3,
Line 33, delete "across" and insert therefore -- a cross --
Line 39, delete "an" and insert therefore -- a --

Column 6,
Line 66, delete "perform" and insert therefore -- preform --

Column 7,
Lines 39 and 40, delete "$L_p = 2r \sin \theta_{100}/\sin \theta_z$," and insert therefore
-- $L_p = 2r \sin \theta_\phi/\sin \theta_z$, --
Line 41, delete "$r_{ic} = r \cos \theta_{100}$." and insert therefore -- $r_{ic} = r \cos \theta_\phi$. --
Lines 48 and 49, delete "$\Psi_{lm}(r,\phi) = J_l(r_{lm}) \exp(-il\Psi)$," and insert therefore
-- $\Psi_{lm}(r,\phi) = J_l(r/r_{lm}) \exp(-il\phi)$, --
Line 51, delete "$\phi \equiv \theta_{100}$)" and insert therefore -- $\phi \equiv \theta_\phi$. --

Column 11,
At the beginning of the last line under Table 4, delete "$L_{90}/r_0$ for $r_b/r_0$ - 0.5" and insert therefore -- $L_{90}/r_0$ for $r_b/r_0 = 0.5$ --

UNITED STATES PATENT AND TRADEMARK OFFICE
CERTIFICATE OF CORRECTION

PATENT NO.   : 6,411,762 B1
DATED        : June 25, 2002
INVENTOR(S)  : Anthon et al.

It is certified that error appears in the above-identified patent and that said Letters Patent is hereby corrected as shown below:

<u>Column 14,</u>
Line 52, delete "1 5" after "GRIN"

Signed and Sealed this

Twenty-eighth Day of January, 2003

JAMES E. ROGAN
*Director of the United States Patent and Trademark Office*